US012347604B2

(12) United States Patent
Furukawa et al.

(10) Patent No.: US 12,347,604 B2
(45) Date of Patent: Jul. 1, 2025

(54) FRAME MEMBER-INCLUDING INDUCTOR AND FRAME MEMBER-INCLUDING LAMINATED SHEET

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 553 days.

(21) Appl. No.: 17/174,985

(22) Filed: Feb. 12, 2021

(65) Prior Publication Data

US 2021/0257148 A1 Aug. 19, 2021

(30) Foreign Application Priority Data

Feb. 17, 2020 (JP) ................................ 2020-024309

(51) Int. Cl.
*H01F 27/28* (2006.01)
*H01F 17/00* (2006.01)

(52) U.S. Cl.
CPC ..... *H01F 27/2866* (2013.01); *H01F 17/0013* (2013.01); *H01F 2017/0066* (2013.01)

(58) Field of Classification Search
CPC ............ H01F 27/2866; H01F 17/0013; H01F 2017/0066
USPC ........................................................ 336/200
See application file for complete search history.

(56) References Cited

U.S. PATENT DOCUMENTS 6,876,554 B1 * 4/2005 Inagaki ................. H01L 23/642 257/E23.079
10,056,182 B2 * 8/2018 Murtagian ............ H01F 17/045
11,217,542 B2 * 1/2022 Zhang ................. H01L 21/4857
2004/0061587 A1 * 4/2004 Hong .................. H01F 27/2804 336/200
2004/0108934 A1 * 6/2004 Choi ..................... H01F 41/046 336/200
2008/0309443 A1 * 12/2008 Furuya .................. H01F 41/127 336/83
2010/0259353 A1 * 10/2010 Saito ..................... H01F 41/127 336/205
2012/0212919 A1 8/2012 Mano et al.
2013/0265131 A1 * 10/2013 Yang .................. H01F 17/0013 29/602.1

(Continued)

FOREIGN PATENT DOCUMENTS

EP 2963094 A1 1/2016
JP 06120064 A * 4/1994

(Continued)

OTHER PUBLICATIONS

Office Action, issued by the Japanese Patent Office on Dec. 5, 2023, in connection with Japanese Patent Application No. 2020-024309.

(Continued)

*Primary Examiner* — Shawki S Ismail
(74) *Attorney, Agent, or Firm* — Edwards Neils LLC; Jean C. Edwards, Esq.

(57) ABSTRACT

A frame member-including inductor includes an inductor including a plurality of wirings, and a magnetic layer embedding the plurality of wirings, and a frame member in which the inductor is set.

6 Claims, 5 Drawing Sheets

(56) References Cited

U.S. PATENT DOCUMENTS

| | | | |
|---|---|---|---|
| 2016/0126006 | A1 | 5/2016 | Ahn et al. |
| 2017/0053732 | A1 | 2/2017 | Moon |
| 2017/0062115 | A1 | 3/2017 | Kang et al. |
| 2018/0286560 | A1 | 10/2018 | Oh et al. |
| 2019/0198235 | A1 | 6/2019 | Yang et al. |

FOREIGN PATENT DOCUMENTS

| | | | | |
|---|---|---|---|---|
| JP | 09148139 | A | * | 6/1997 |
| JP | 2001-203119 | A | | 7/2001 |
| JP | 2002164240 | A | * | 6/2002 |
| JP | 2006-140369 | A | | 6/2006 |
| JP | 2008-306017 | A | | 12/2008 |
| JP | 2012-234986 | A | | 11/2012 |
| JP | 2014-063782 | A | | 4/2014 |
| JP | 2014-165363 | A | | 9/2014 |
| JP | 2016-092422 | A | | 5/2016 |
| JP | 2017-063126 | A | | 3/2017 |
| JP | 2018-170494 | A | | 11/2018 |
| JP | 2019-220618 | A | | 12/2019 |
| TW | 201249270 | A1 | | 12/2012 |

OTHER PUBLICATIONS

Office Action, issued by the Taiwanese Patent Office on Jun. 12, 2024, in connection with Taiwanese Patent Application No. 110105382.

Office Action, issued by the Korean Intellectual Property Office on Feb. 5, 2025, in connection with Korean Patent Application No. 10-2021-0018808.

* cited by examiner

FRAME MEMBER-INCLUDING INDUCTOR AND FRAME MEMBER-INCLUDING LAMINATED SHEET

CROSS REFERENCE TO RELATED APPLICATION

The present application claims priority from Japanese Patent Application No. 2020-024309 filed on Feb. 17, 2020, the contents of which are hereby incorporated by reference into this application.

TECHNICAL FIELD

The present invention relates to a frame member-including inductor and a frame member-including laminated sheet.

BACKGROUND ART

Conventionally, an inductor has been known to be mounted on an electronic device. As such an inductor, a small inductor including a wiring and a magnetic layer covering the wiring and containing flat-shaped magnetic particles has been proposed (ref: for example, Patent Document 1 below)

PRIOR ART DOCUMENT

Patent Document

[Patent Document 1] Japanese Unexamined Patent Publication No. 2019-220618

SUMMARY OF THE INVENTION

Problems to be Solved by the Invention

However, it is necessary to form a via in the magnetic layer of the inductor for electrically connecting the wiring to the electronic device. However, as a conveyance device which conveys the inductor to a processing device for forming the via and conveys a workpiece of the inductor after processing, from the viewpoint of industrial production efficiency, a large workpiece is usually used, and the device is designed in accordance therewith. Then, there is a problem that the small inductor as described in Patent Document 1 cannot be conveyed with the conveyance device.

Therefore, enlargement of the small inductor is considered. However, it is quite difficult to enlarge it while maintaining the accuracy of an interval between the wirings and the accuracy of a layer thickness. Also, producing a small sheet-shaped inductor using a conveyance device designed to match the large workpiece of each company incurs a cost increase. Furthermore, in the large sheet-shaped inductor with respect to the small sheet-shaped inductor, there is a problem that the influence of warping is increased, and further, the accuracy is reduced.

The present invention provides a frame member-including inductor and a frame member-including laminated sheet which can efficiently and reliably process even a small sheet-shaped inductor.

Solution to the Problems

The present invention (1) includes a frame member-including inductor including a sheet-shaped inductor including a plurality of wirings, and a magnetic layer embedding the plurality of wirings, and a frame member in which the inductor is set.

In the frame member-including inductor, the inductor is set in the frame member. Therefore, even when the inductor is small, in a case where the frame member has a dimension that can be conveyed with a conveyance device, the frame member and the inductor can be reliably conveyed with the conveyance device, and accordingly, they are conveyed to a conventional device for forming a via to be reliably formed in the magnetic layer of the inductor. Further, when the inductor is small, the influence of warping can be reduced. As a result, in the frame member-including inductor, the via can be efficiently and reliably formed in the inductor.

The present invention (2) includes the frame member-including inductor described in (1), wherein the plurality of inductors are set in the frame member.

In the frame member-including inductor, since the plurality of inductors are set in the frame member, the via can be more efficiently formed.

The present invention (3) includes a frame member-including laminated sheet including the frame member-including inductor described in (1) or (2) and a processing stability layer formed on one surfaces in a thickness direction of an inductor and a frame member and including a cured product of a thermosetting resin composition.

Since the frame member-including laminated sheet further includes the processing stability layer, it is possible to improve the processability of one surfaces of the inductor and the frame member.

The present invention (4) includes the frame member-including laminated sheet described in (3) further including a second processing stability layer formed on the other surfaces in the thickness direction of the inductor and the frame member and including a cured product of a thermosetting resin composition.

Since the frame member-including laminated sheet further includes the second processing stability layer, it is possible to improve the processability of the other surfaces of the inductor and the frame member.

Effect of the Invention

In the frame member-including inductor of the present invention, the via can be efficiently and reliably formed in the inductor.

In the frame member-including laminated sheet of the present invention, it is possible to improve the processability of one surfaces of the inductor and the frame member.

BRIEF DESCRIPTION OF THE DRAWINGS

FIG. 1A illustrating a fourth step,

FIG. 2A illustrating a fourth step,

FIG. 2B illustrating a first step, and

FIG. 2C illustrating a second step.

FIG. 3A illustrating a step of filling the processing stability layer into a via and FIG. 3B illustrating a step of forming the via in the processing stability layer.

FIG. 4A illustrating a frame member-including laminated sheet without including a processing stability layer, FIG. 4B illustrating a step of forming a via in the frame member-including laminated sheet of FIG. 4A, FIG. 4C illustrating a step of disposing a processing stability layer in the frame member-including laminated sheet of FIG. 4B, and FIG. 4D illustrating a step of forming the via of FIG. 4C in the processing stability layer.

FIG. 5A illustrating a step of disposing a frame member in a carrier sheet,

FIG. 5B illustrating a first step,

FIG. 5C illustrating a second step,

FIG. 5D illustrating a third step, and

FIG. 5B illustrating a step of forming a via in a processing stability layer.

EMBODIMENT OF THE INVENTION

One Embodiment

Figures 1A, 1B, 1C, 1D:
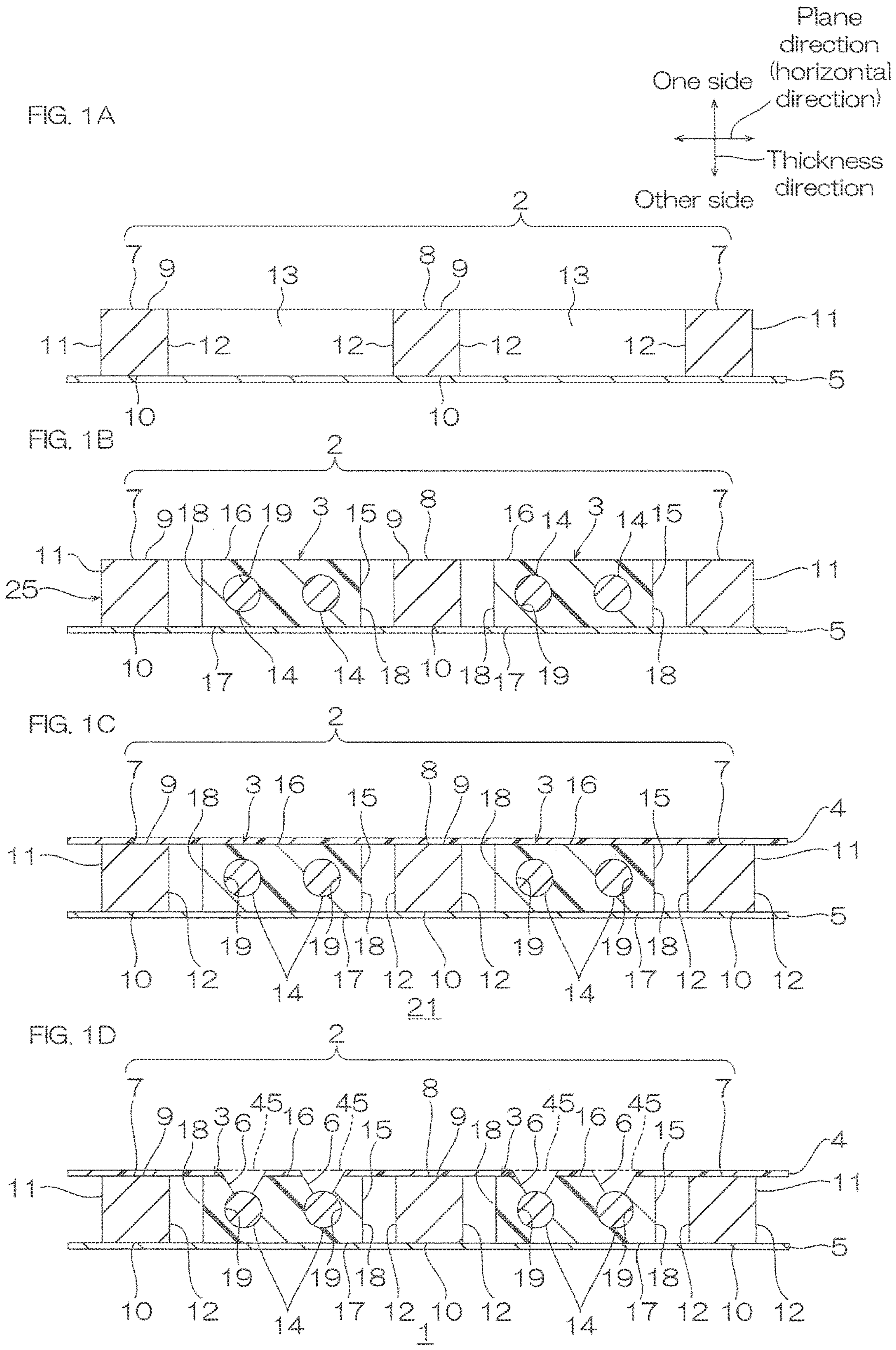
FIGS. 1A to ID show steps for illustrating one embodiment of a method for producing a frame member-including laminated sheet of the present invention, and a processing embodiment thereof.
FIG. 1B illustrating a first step.
FIG. 1C illustrating a third step.
FIG. 1D illustrating a second step.

One embodiment of a frame member-including laminated sheet of the present invention is described with reference to FIGS. 1C and 2B.

A frame member-including laminated sheet 21 has a predetermined thickness, and has a sheet shape extending in a plane direction perpendicular to a thickness direction. For example, the frame member-including laminated sheet 21 has a generally rectangular shape when viewed from the top. The frame member-including laminated sheet 21 includes a frame member 2, a sheet-shaped inductor 3, a processing stability layer 4, and a second processing stability layer 5.

The frame member 2 has a dimension which can be conveyed with a conveyance device to be described later. The frame member 2 has a generally rectangular outer shape when viewed from the top. The frame member 2 has a generally grid shape when viewed from the top. Specifically, the frame member 2 integrally includes an outer frame 7 and an inner frame 8.

The outer frame 7 has a generally rectangular frame shape when viewed from the top. The outer frame 7 has four sides.

The inner frame 8 has a generally well curb shape when viewed from the top. Specifically, the inner frame 8 is continuous to the inner-side portion located inside with respect to both end portions in each of the four sides of the outer frame 7. The inner frame 8 includes a vertical frame and a horizontal frame. The vertical frame and the horizontal frame are perpendicular to each other when viewed from the top.

Further, the frame member 2 has a one surface 9, an other surface 10, an outer-side surface 11, and an inner-side surface 12 in the thickness direction.

The one surface 9 of the outer frame 7 and the one surface 9 of the inner frame 8 are flush with each other. Therefore, the one surface 9 has the same thickness over the plane direction.

The other surface 10 is spaced apart from the other side in the thickness direction of the one surface 9. The other surface 10 of the inner frame 8 and the other surface 10 of the outer frame 7 are flush with each other. Therefore, the other surface 10 has the same thickness over the plane direction.

The outer-side surface 11 is a peripheral side surface of the outer frame 7. The outer-side surface 11 connects the peripheral end edge of the one surface 9 of the outer frame 7 to the peripheral end edge of the other surface 10 of the outer frame 7.

Figure 2A:
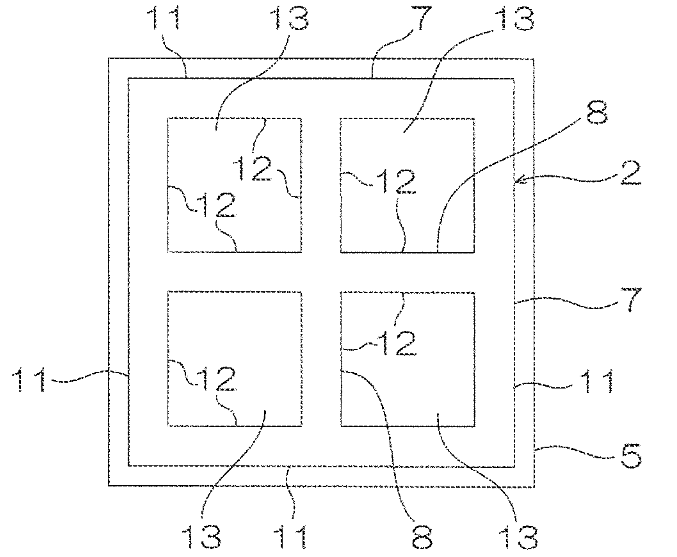
FIGS. 2A to 2C show steps for illustrating one embodiment of a method for producing a frame member-including laminated sheet of the present invention, and a processing embodiment thereof.

The inner-side surface 12 is an inner peripheral side surface of the frame member 2. In this embodiment, the inner-side surface 12 is included in the opposing surface facing the outer-side surface 11 and the side surface in the inner frame 8 of the side surfaces in the outer frame 7. The inner-side surface 12 partitions a housing chamber (ref: FIG. 2A) 13 having a generally rectangular shape when viewed from the top. The plurality of housing chambers 13 are disposed at spaced intervals to each other in the plane direction.

A material for the frame member 2 is not particularly limited, and examples thereof include metals, resins, and ceramics. Preferably, a resin is used.

The lower limit of a thickness of the frame member 2 is, for example, 10 μm, and the upper limit thereof is, for example, 10,000 μm.

The frame member 2 has a dimension larger than the dimension of the inductor 3 to be described next when viewed from the top. For example, the lower limit of a length in a direction in which the four sides of the outer frame 7 extend is, for example, 100 mm, preferably 200 mm, more preferably 300 mm, and the upper limit thereof is, for example, 1,000 mm.

The inductor 3 is set at the inside of the frame member 2. Specifically, the inductor 3 is housed in each of the plurality of housing chambers 13 when viewed from the top. Thus, the plurality of inductors 3 are disposed in alignment across the inner frame 8 of the frame member 2 in a vertical direction (direction included in the plane direction and direction in which the vertical frame of the inner frame 8 extends) and a horizontal direction (direction included in the plane direction and direction in which the horizontal frame of the inner frame 8 extends).

The inductor 3 has a predetermined thickness, and extends in the plane direction. The inductor 3 has a generally rectangular shape when viewed from the top. The inductor 3 includes a plurality of wirings 14 and a magnetic layer 15.

The plurality of wirings 14 are adjacent to each other at spaced intervals in the horizontal direction. The plurality of wirings 14 are parallel with each other. The plurality of wirings 14 extend in the vertical direction. A shape, a dimension, a configuration, a material, and a formulation (filling rate, content ratio, or the like) of the wiring 14 are, for example, described in Japanese Unexamined Patent Publication No. 2019-220618 or the like. Preferably, the wiring 14 has a generally circular shape in the cross section along the thickness direction and the horizontal direction, and the lower limit of the diameter thereof is, for example, 25 μm, and the upper limit of the diameter thereof is, for example, 2,000 μm. The wiring 14 preferably includes a conducting wiring made of a conductor, and an insulating film covering a peripheral surface of the conducting wiring.

The lower limit of an interval between the wirings 14 adjacent to each other is, for example, 10 μm, preferably 50 μm, and the upper limit of an interval between the wirings 14 adjacent to each other is, for example, 5,000 μm, preferably 3,000 μm. The upper limit of a ratio (diameter/interval) of the diameter of the wiring 14 to the interval between the wirings 14 adjacent to each other is, for example, 200, preferably 50, and the lower limit thereof is, for example, 0.01, preferably 0.1.

The magnetic layer 15 improves the inductance of the inductor 3. The magnetic layer 15 has the same outer shape as the inductor 3 when viewed from the top. The magnetic layer 15 has a plate shape extending in the plane direction. Further, the magnetic layer 15 embeds the plurality of wirings 14 when viewed in the cross-sectional view. The magnetic layer 15 has a one surface 16, an other surface 17, an outer-side surface 18, and an inner peripheral surface 19.

The one surface 16 forms one surface in the thickness direction of the magnetic layer 15

The other surface 17 forms the other surface in the thickness direction of the magnetic layer 15. The other surface 17 is spaced apart from the other side in the thickness direction of the one surface 16.

The outer-side surface 18 is an outer peripheral surface of the magnetic layer 15. The outer-side surface 18 connects the peripheral end edge of the one surface 16 to the peripheral end edge of the other surface 17.

The inner peripheral surface 19 is spaced apart from the one surface 16 and the other surface 17 in the thickness direction. The inner peripheral surface 19 is located between the one surface 16 and the other surface 17 in the thickness direction. Further, the inner peripheral surface 19 is located between the two outer-side surfaces 18 facing each other in the horizontal direction. The inner peripheral surface 19 is in contact with the outer peripheral surface of the wiring 14.

The magnetic layer 15 contains a binder and magnetic particles. Specifically, a material for the magnetic layer 15 is a magnetic composition containing the binder and the magnetic particles.

The binder is a matrix for dispersing the magnetic particles. Examples of the binder include thermoplastic resins such as an acrylic resin and thermosetting resins such as an epoxy resin composition. The acrylic resin includes, for example, a carboxyl group-including acrylic acid ester copolymer. The epoxy resin composition includes, for example, an epoxy resin (cresol novolac epoxy resin or the like) as a main agent, a curing agent for an epoxy resin (phenol resin or the like), and a curing accelerator for an epoxy resin (imidazole compound or the like). As the binder, the thermoplastic resin and the thermosetting resin can be used alone or in combination of two or more, and preferably, the thermoplastic resin and the thermosetting resin are used in combination of two or more. A volume ratio of the binder in the magnetic composition is a remaining portion of a volume ratio of the magnetic particles to be described later.

The magnetic particles are, for example, dispersed in the binder. In the present embodiment, the magnetic particles have a generally flat shape. The generally flat shape includes a generally plate shape.

The lower limit of a flat ratio (flat degree) of the magnetic particles is, for example, 8, preferably 15, and the upper limit thereof is, for example, 500, preferably 450. The flat ratio is, for example, calculated as an aspect ratio obtained by dividing a median diameter of the magnetic particles by an average thickness of the magnetic particles.

The lower limit of the median diameter of the magnetic particles is, for example, 3.5 μm, preferably 10 μm, and the upper limit thereof is, for example, 200 μm, preferably 150 μm. The lower limit of the average thickness of the magnetic particles is, for example, 0.1 μm, preferably 0.2 μm, and the upper limit thereof is, for example, 3.0 μm, preferably 2.5 μm.

Further, a material for the magnetic particles is a metal. Examples of the metal include magnetic bodies such as a soft magnetic body and a hard magnetic body. Preferably, from the viewpoint of ensuring excellent inductance, a soft magnetic body is used.

Examples of the soft magnetic body include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, or the like). These may be used alone or in combination of two or more.

An example of the single metal body includes a metal single body consisting of only one kind of metal element (first metal element). The first metal element is, for example, appropriately selected from iron (Fe), cobalt (Co), nickel (Ni), and another metal element that can be included as the first metal element of the soft magnetic body.

Further, examples of the single metal body include an embodiment including a core including only one kind of metal element and a surface layer including an inorganic material and/or an organic material which modify/modifies a portion of or the entire surface of the core, and an embodiment in which an organic metal compound and an inorganic metal compound including the first metal element are decomposed (thermally decomposed or the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the surface described above. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, or the like) and can be used as an alloy body of a soft magnetic body.

The first metal element is an essential element in the alloy body, and examples thereof include iron (Fe), cobalt (Co), and nickel (Ni). When the first metal element is Fe, the alloy body is referred to as a Fe-based alloy; when the first metal element is Co, the alloy body is referred to as a Co-based alloy; and when the first metal element is Ni, the alloy body is referred to as a Ni-based alloy.

The second metal element is an element (auxiliary component) which is auxiliary included in the alloy body, and is a metal element which is compatible (eutectic) with the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (auxiliary component) which is auxiliary included in the alloy body and is a non-metal element which is compatible (eutectic) with the first metal element, and examples thereof include boron (B), carbon (C), nitrogen (N), silicon (Si), phosphorus (P), and sulfur(S). These may be used alone or in combination of two or more.

Examples of the Fe-based alloy which is one example of an alloy body include magnetic stainless steel (Fe—Cr—Al—Si alloy) (including electromagnetic stainless steel), Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B (—Cu—Nb) alloy, Fe—B—Si—Cr alloy, Fe—Si—Cr—Ni alloy, Fe—Si—Cr alloy, Fe—Si—Al—Ni—Cr alloy, Fe—Ni—Si—Co alloy, Fe—N alloy, Fe—C alloy, Fe—B alloy, Fe—P alloy, ferrite (including stainless steel-based ferrite, and furthermore, soft ferrite such as Mn—Mg-based ferrite, Mn—Zn-based ferrite, Ni—Zn-based ferrite, Ni—Zn—Cu-based ferrite, Cu—Zn-based ferrite, and Cu—Mg—Zn-based ferrite), Permendur (Fe—Co alloy), Fe—Co—V alloy, and Fe-based amorphous alloy.

Examples of the Co-based alloy which is one example of an alloy body include Co—Ta—Zr and a cobalt (Co)-based amorphous alloy.

An example of the Ni-based alloy which is one example of an alloy body includes a Ni—Cr alloy.

A more detailed formulation of the above-described magnetic composition is described in Japanese Unexamined Patent Publication No. 2014-165363 or the like.

The lower limit of a volume ratio of the magnetic particles in the magnetic composition is, for example, 40% by volume, preferably 50% by volume, more preferably 60% by volume, and the upper limit thereof is, for example, 95% by volume, preferably 90% by volume.

The lower limit of a thickness of the inductor 3 is, for example, 30 μm, preferably 40 μm, and the upper limit of the thickness of the inductor 3 is, for example, 2,500 μm, preferably 2,000 μm.

In each of the plurality of inductors 3, the thickness of the inductor 3 is adjusted with high accuracy.

Also, the lower limit of a ratio of the thickness of the inductor 3 to the thickness of the frame member 2 is, for example, 0.1, preferably 0.5, more preferably 0.8, and the upper limit thereof is, for example, 10, preferably 2, more preferably 1.2.

Figure 5A:
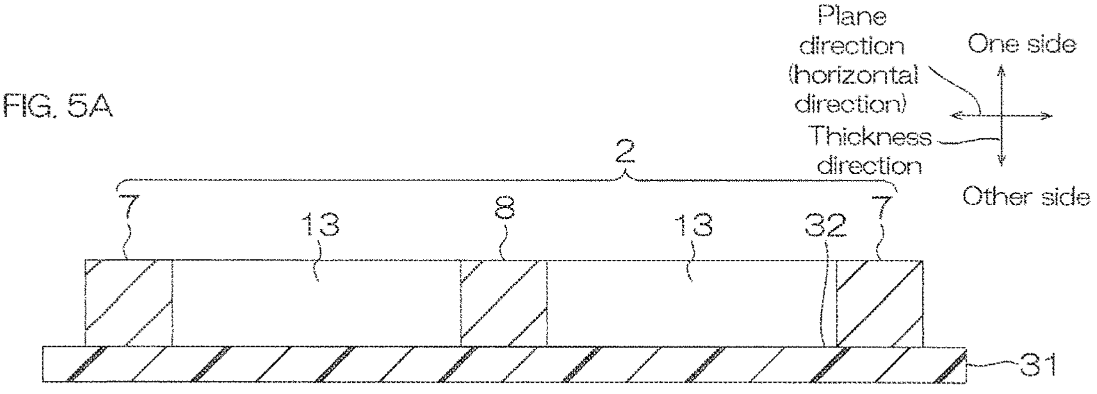
FIGS. 5A to 5E show steps for illustrating one embodiment of a frame member-including inductor of the present invention, and a processing embodiment thereof.
Figure 5B:
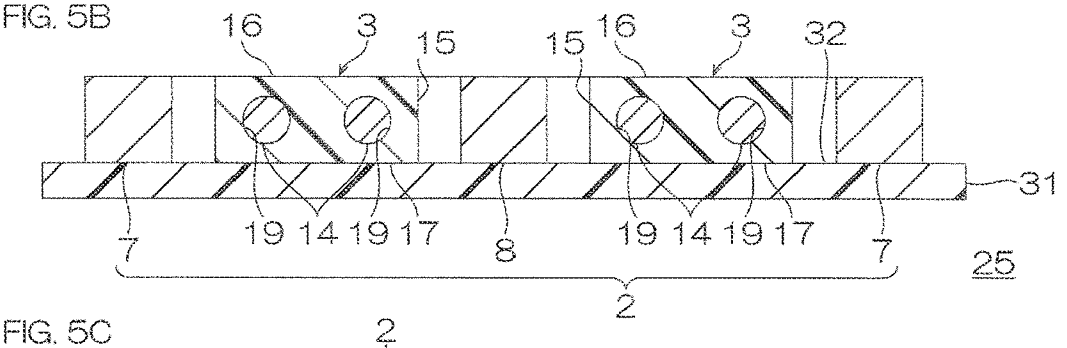

The frame member 2 and the inductor 3 described above constitute a frame member-including inductor 25 (ref: FIG. 5B).

The processing stability layer 4 improves the surface processability with respect to the one surface 16 of the inductor 3. The processing stability layer 4 forms one surface in the thickness direction of the frame member-including laminated sheet 21. The processing stability layer 4 is in contact with the one surface 9 of the frame member 2 and the one surface 16 of the magnetic layer 15 in the frame member 2. The processing stability layer 4 has a sheet shape extending in the plane direction. Specifically, the processing stability layer 4 has the same outer shape as the frame member-including laminated sheet 21 when viewed from the top. The processing stability layer 4 has a larger outer shape than that of the frame member 2. Further, the processing stability layer 4 blocks one end in the thickness direction of the housing chamber 13 of the frame member 2.

The processing stability layer 4 includes a cured product of a thermosetting resin composition. In other words, a material for the processing stability layer 4 includes the thermosetting resin composition. The thermosetting resin composition includes a thermosetting resin as an essential component.

The thermosetting resin includes a main agent, a curing agent, and a curing accelerator.

Examples of the main agent include an epoxy resin and a silicone resin, and preferably, an epoxy resin is used. Examples of the epoxy resin include bifunctional epoxy resins such as a bisphenol A epoxy resin, a bisphenol F epoxy resin, a bisphenol S epoxy resin, a modified bisphenol A epoxy resin, a modified bisphenol F epoxy resin, a modified bisphenol S epoxy resin, and a biphenyl epoxy resin; and trifunctional or more polyfunctional epoxy resins such as a phenol novolac epoxy resin, a cresol novolac epoxy resin, a trishydroxyphenylmethane epoxy resin, a tetraphenylol ethane epoxy resin, and a dicyclopentadiene epoxy resin. These epoxy resins may be used alone or in combination of two or more. Preferably, a bifunctional epoxy resin is used, more preferably, a bisphenol A epoxy resin is used.

The lower limit of an epoxy equivalent of the epoxy resin is, for example, 10 g/eq., and the upper limit thereof is, for example, 1,000 g/eq.

When the main agent is the epoxy resin, examples of the curing agent include a phenol resin and an isocyanate resin. Examples of the phenol resin include polyfunctional phenol resins such as a phenol novolac resin, a cresol novolac resin, a phenol aralkyl resin, a phenol biphenylene resin, a dicyclopentadiene phenol resin, and a resol resin. These may be used alone or in combination of two or more. As the phenol resin, preferably, a phenol novolac resin and a phenol biphenylene resin are used. When the main agent is the epoxy resin and the curing agent is the phenol resin, the lower limit of the total sum of hydroxyl groups in the phenol resin is, for example, 0.7 equivalents, preferably 0.9 equivalents, and the upper limit thereof is, for example, 1.5 equivalents, preferably 1.2 equivalents with respect to 1 equivalent of epoxy groups in the epoxy resin. Specifically, the lower limit of the number of parts by mass of the curing agent is, for example, 1 part by mass, and the upper limit thereof is, for example, 50 parts by mass with respect to 100 parts by mass of the main agent.

The curing accelerator is a catalyst (thermosetting catalyst) which promotes curing of the main agent (preferably, epoxy resin curing accelerator), and examples thereof include an organic phosphorus compound, and imidazole an compound such as 2-phenyl-4-methyl-5-hydroxymethylimidazole (2P4MHZ). The lower limit of the number of parts by mass of the curing accelerator is, for example, 0.05 parts by mass, and the upper limit thereof is, for example, S parts by mass with respect to 100 parts by mass of the main agent.

Further, the thermosetting resin composition may, for example, include particles as an optional component. The particles are dispersed in the thermosetting resin. The particles are, for example, at least one kind selected from the group consisting of first particles and second particles.

The first particles have, for example, a generally spherical shape. The lower limit of the median diameter of the first particles is, for example, 1 μm, preferably 5 μm, and the upper limit of the median diameter of the first particles is, for example, 250 μm, preferably 200 μm. The median diameter of the first particles is determined with a laser diffraction particle size distribution measuring device. The median diameter of the first particles can be also determined, for example, by binarization process by cross-sectional observation.

A material for the first particles is not particularly limited. Examples of the material for the first particles include metals, an inorganic compound, and an organic compound, and in order to increase the thermal expansion coefficient, preferably, metals and an inorganic compound are used.

The metals are included in the thermosetting resin composition when the processing stability layer 4 functions as an inductance-improving layer. An example of the metals includes the magnetic body illustrated in the magnetic layer 15, and preferably, an organic iron compound including iron as the first metal element is used, more preferably, carbonyl iron is used.

The inorganic compound is included in the thermosetting resin composition when the processing stability layer 4 functions as a thermal expansion coefficient-suppressing layer. An example of the inorganic compound includes an inorganic filler, and specifically, silica and alumina are used, preferably, silica is used.

Specifically, as the first particles, preferably, spherical silica is used, and preferably, spherical carbonyl iron is used.

The second particles have, for example, a generally flat shape. The generally flat shape includes a generally plate shape.

The lower limit of a flat ratio (flat degree) of the second particles is, for example, 8, preferably 15, and the upper limit thereof is, for example, 500, preferably 450. The flat ratio of the second particles is determined by the same calculation method as the flat ratio of the magnetic particles in the magnetic layer 15 described above.

The lower limit of the median diameter of the second particles is, for example, 1 μm, preferably 5 μm, and the upper limit of the median diameter of the second particles is, for example, 250 μm, preferably 200 μm. The median diameter of the second particles is determined in the same manner as that of the first particles.

The lower limit of the average thickness of the second particles is, for example, 0.1 μm, preferably 0.2 μm, and the upper limit thereof is, for example, 3.0 μm, preferably 2.5 μm.

A material for the second particles is, for example, an inorganic compound. An example of the inorganic compound includes a thermally conductive compound such as boron nitride. Accordingly, preferably, the inorganic compound is included in the thermosetting resin composition when the processing stability layer 4 functions as a thermal conductivity-improving layer.

Specifically, as the second particles, preferably, a flat-shaped boron nitride is used.

One kind or both of the first particles and the second particles are included in the thermosetting resin composition.

The lower limit of the number of parts by mass of the particles (first particles and/or second particles) is, for example, 10 parts by mass, preferably 50 parts by mass, and the upper limit thereof is, for example, 2,000 parts by mass, preferably 1,500 parts by mass with respect to 100 parts by mass of the thermosetting resin. Further, the lower limit of a content ratio of the particles in the cured product is, for example, 10% by mass, and the upper limit thereof is, for example, 90% by mass. When both of the first particles and the second particles are included in the thermosetting resin composition, the lower limit of the number of parts by mass of the second particles is, for example, 30 parts by mass, and the upper limit thereof is, for example, 300 parts by mass with respect to 100 parts by mass of the first particles.

Since the particles are an optional component in the thermosetting resin composition, the thermosetting resin composition may not include the particles.

On the other hand, the material for the processing stability layer 4 may further include a thermoplastic resin. An example of the thermoplastic resin includes the thermoplastic resin illustrated in the binder of the wiring 14. The lower limit of the number of parts by mass of the thermoplastic resin is, for example, 1 part by mass, and the upper limit thereof is, for example, 100 parts by mass with respect to 100 parts by mass of the thermosetting resin.

The lower limit of a thickness of the processing stability layer 4 is, for example, 1 μm, preferably 10 μm, and the upper limit thereof is, for example, 1,000 μm, preferably 100 μm. The lower limit of a ratio of the thickness of the processing stability layer 4 to the thickness of the inductor 3 is, for example, 0.001, preferably 0.005, more preferably 0.01, and the upper limit thereof is, for example, 0.5, preferably 0.3, more preferably 0.1.

The thickness of the processing stability layer 4 is adjusted with high accuracy.

The second processing stability layer 5 improves the surface processability with respect to the inductor 3. The second processing stability layer 5 forms the other surface in the thickness direction of the frame member-including laminated sheet 21. The second processing stability layer 5 is in contact with the other surface 10 of the frame member 2 and the other surface 17 of the magnetic layer 15 in the frame member 2. The second processing stability layer 5 has a sheet shape extending in the plane direction. Specifically, the second processing stability layer 5 has, for example, the same outer shape as the processing stability layer 4 when viewed from the top. Further, the second processing stability layer 5 blocks the other end in the thickness direction of the housing chamber 13 of the frame member 2. Thus, in the housing chamber 13, the communication with the outside is interrupted.

The second processing stability layer 5 includes a cured product of a thermosetting resin composition, and a material for the second processing stability layer 5 includes the thermosetting resin composition illustrated in the processing stability layer 4.

The lower limit of a thickness of the second processing stability layer 5 is, for example, 1 μm, preferably 10 μm, and the upper limit thereof is, for example, 1,000 μm, preferably 100 μm. The lower limit of a ratio of the thickness of the second processing stability layer 5 to the thickness of the inductor 3 is, for example, 0.001, preferably 0.005, more preferably 0.01, and the upper limit thereof is, for example, 0.5, preferably 0.3, more preferably 0.1.

The thickness of the second processing stability layer 5 is adjusted with high accuracy.

The thickness of the second processing stability layer 5 may be the same as or different from the thickness of the processing stability layer 4. The lower limit of a ratio (thickness of the processing stability layer 4/thickness of the second processing stability layer 5) of the thickness of the processing stability layer 4 to the thickness of the second processing stability layer 5 is, for example, 0.05, preferably 0.1, preferably 0.2, and the upper limit thereof is, for example, 10, preferably 5.

Next, one embodiment of a method for producing the frame member-including laminated sheet 21 is described with reference to FIGS. 1A to 2C.

The method for producing the frame member-including laminated sheet 21 includes a fourth step, a first step, and a third step in order. That is, in this method, the fourth step, the first step, and the third step are carried out in order.

Further, in the producing method and processing (processing including the formation of a via 6 in the second step) of the frame member-including laminated sheet 21, a member to be fabricated in each step is conveyed with a conveyance device, and it is subjected to a device in the next step. The conveyance device is large, and it is possible to convey a conveyed object (the frame member 2) with a width (length in a direction perpendicular to the conveyance direction and the thickness direction) of, for example, 100 mm or more, preferably 200 mm or more, more preferably 300 mm or more.

In the fourth step, as shown in FIGS. 1A and 2A, the second processing stability layer 5 is disposed on the other surface of the frame member 2.

For example, a solvent is further blended into the material for the second processing stability layer 5 to prepare a varnish, and the obtained varnish is applied to the surface of a release sheet (not shown) to be dried, thereby forming the second processing stability layer 5. In the second processing stability layer 5, the thermosetting resin composition is, for example, in a B-stage state or a C-stage state.

Subsequently, one surface in the thickness direction of the second processing stability layer 5 is brought into contact with the other surface 10 of the frame member 2. Specifically, the frame member 2 is placed on one surface of the second processing stability layer 5.

Figure 2B:
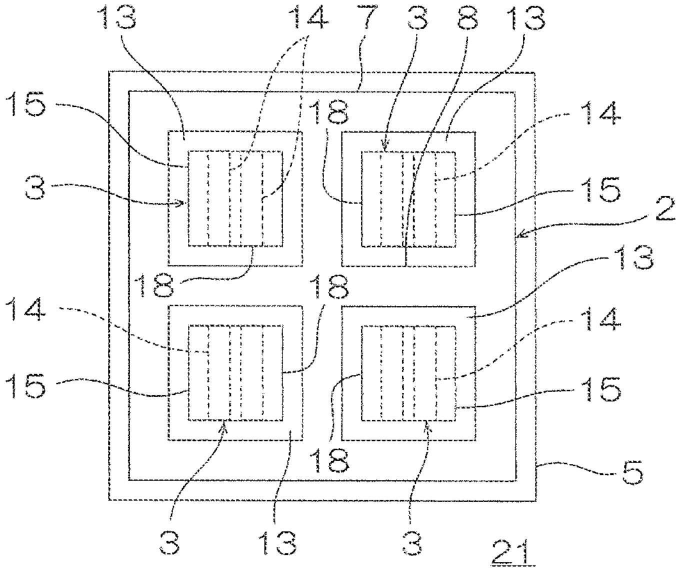

Then, in the first step, as shown in FIGS. 1B and 2B, the plurality of inductors 3 are set at the inside of the frame member 2. Specifically, each of the other surfaces 17 of the plurality of inductors 3 is brought into contact with one surface in the thickness direction of the second processing stability layer 5 exposed from the plurality of housing chambers 13. When the second processing stability layer 5 is in a B-stage state, the inductor 3 is in tight contact with the second processing stability layer 5.

Further, when the inductor 3 is set at the inside of the frame member 2, for example, it is possible to further use a fixing means such as fitting by a fitting member, screwing by screws, attraction by magnetic force, and adhesion by an adhesive.

In the third step, as shown in FIG. 1C, the processing stability layer 4 is formed on the one surface 16 of the inductor 3 and the one surface 9 of the frame member 2.

Specifically, a solvent is further blended into the material for the processing stability layer 4 to prepare a varnish, and the obtained varnish is applied to the surface of a release sheet (not shown) to be dried, thereby forming the processing stability layer 4. In the processing stability layer 4, the thermosetting resin composition is in a B-stage state or a C-stage state, and is preferably in a B-stage state. Thereafter, the processing stability layer 4 is brought into contact with the entire one surface 16 of the inductor 3, and the entire one surface 9 of the frame member 2. When the processing stability layer 4 is in a B-stage state, the processing stability layer 4 is in tight contact with the inductor 3 and the frame member 2.

Thereafter, when the processing stability layer 4 and the second processing stability layer 5 are in a B-stage state, the processing stability layer 4 and the second processing stability layer 5 are heated to be brought into a C-stage state. Thus, the processing stability layer 4 adheres to the inductor 3 and the frame member 2. At the same time, the second processing stability layer 5 adheres to the inductor 3 and the frame member 2.

Or, when the processing stability layer 4 is in a B-stage state, while the second processing stability layer 5 is already in a C-stage state, the processing stability layer 4 is brought into a C-stage state. Thus, the processing stability layer 4 adheres to the inductor 3 and the frame member 2. In this case, the frame member 2 is only placed on the second processing stability layer 5, i.e., the frame member 2 is in contact with the second processing stability layer 5, and does not adhere (is not fixed) thereto.

Thus, the frame member-including laminated sheet 21 including the frame member 2, the inductor 3, the processing stability layer 4, and the second processing stability layer 5 is produced. The frame member-including laminated sheet 21 may include a fixing means which is not shown.

The frame member-including laminated sheet 21 is an intermediate component for producing a via-including laminated sheet 1 to be described next, does not have the via 6 yet, and is not the via-including laminated sheet 1. The frame member-including laminated sheet 21 is an industrially available device whose component alone can be distributed.

The frame member-including laminated sheet 21 is immersed in various chemical solutions (including cleaning solution for cleaning the resin smear, an electrolytic plating or an electroless plating conditioner, active solution, plating solution, etc.) to be subjected to surface processing after its production or during its production in accordance with its purpose and application.

Further, a slit (not shown) may be formed in the processing stability layer 4 facing the inductor 3 in the frame member-including laminated sheet 21. The slit which is not shown, for example, extends from one surface in the thickness direction of the processing stability layer 4 to the middle in the thickness direction of the magnetic layer 15. However, the slit does not open the wiring 14.

Figure 2C:
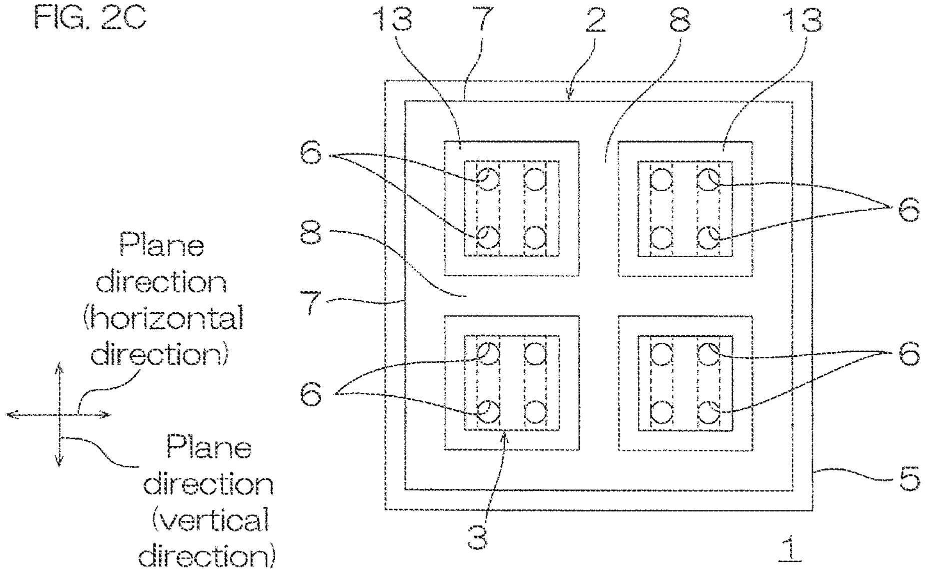

As shown in FIGS. 1D and 2C, thereafter, by carrying out the second step, the via-including laminated sheet 1 is produced.

In the second step, the via 6 is formed in the magnetic layer 15 of the frame member-including laminated sheet 21.

The vias 6 are disposed in both end portions of the inductor 3 in a direction (corresponding to the vertical direction) in which the wiring 14 extends. The via 6 is a through hole that exposes a central portion of one surface in the thickness direction of the wiring 14 and penetrates the magnetic layer 15 and the processing stability layer 3 in the thickness direction located on one side in the thickness direction with respect to the wiring 14 when viewed in the cross-sectional view. The via 6 has a generally circular shape when viewed from the top (not shown). The via 6 also has a tapered shape in which the opening area expands toward one side in the thickness direction when viewed in the cross-sectional view.

Examples of a method for forming the via 6 include contact-type opening using a drilling device and non-contact-type opening using a laser device. The above-described device (processing device) is interposed in a conveyance line of the conveyance device. The via 6 is formed with respect to the inductor 3 on the conveyance line of the conveyance device described above. In the processing device, a predetermined holding portion or the like holds the frame member 2, and the via 6 is formed in the inductor 3.

Function and Effect of One Embodiment

Then, in the frame member-including laminated sheet 21 including the frame member-including inductor 25, the inductor 3 is set in the frame member 2. Therefore, even when the inductor 3 is small, in a case where the frame member 2 has a dimension that can be conveyed with the conveyance device, the frame member 2 and the inductor 3 can be reliably conveyed with the conveyance device, and accordingly, they are conveyed to a conventional device for forming the via 6 to be reliably formed in the magnetic layer 15 of the inductor 3. Further, when the inductor 3 is small, the influence of warping can be reduced. As a result, in the frame member-including laminated sheet 21, the via 6 can be efficiently and reliably formed in the inductor 3.

In the frame member-including laminated sheet 21, since the plurality of inductors 3 are set in the frame member 2, the via 6 can be more efficiently formed.

Furthermore, since the frame member-including laminated sheet 21 further includes the processing stability layer 4, it is possible to improve the processability of the one surface 16 of the inductor 3 and the one surface 9 of the frame member 2.

For example, when the thermosetting resin composition of the processing stability layer 4 is thermally cured and becomes a cured product in a state where the one surface 9 of the outer frame 7 and the other surface of the processing stability layer 4 are in contact with each other, the processing stability layer 4 can adhere to the one surface 9 of the outer frame 7. Then, when the frame member 2 and the inductor 3 in which the processing stability layer 4 is formed is immersed in various chemical solutions (including cleaning solution for cleaning the resin smear, an electrolytic plating or an electroless plating conditioner, active solution, plating solution, etc.) and the inductor 3 is processed, it is possible to prevent the chemical solution from entering between the outer frame 7 and the processing stability layer 4.

Further, even when the slit is formed in the processing stability layer 4 facing the inductor 3, it is possible to suppress deformation of the one surface 16 of the inductor 3.

Furthermore, as shown in FIGS. 1A and 1B, since the frame member-including laminated sheet 21 includes the second processing stability layer 5, it is possible to improve the processability of the other surface 17 of the inductor 3 and the other surface 10 of the frame member 2.

For example, when the second processing stability layer 5 contains a thermosetting resin composition in a B-stage state, i.e., when the second processing stability layer 5 is in a B-stage state, in a case where the inductor 3 is brought into contact with one surface of the second processing stability layer 5, and thereafter, the second processing stability layer 5 is brought into a C-stage state, the inductor 3 adheres to the second processing stability layer 5. Further, the frame member 2 also adheres to the second processing stability layer 5. Then, the inductor 3 can be moved in the plane direction together with the frame member 2. Then, in the second step, the positional accuracy of the inductor 3 is increased, and therefore, the via 6 can be accurately formed in the inductor 3.

The second processing stability layer 5 in a B-stage state and the processing stability layer 4 in a B-stage state can be also brought into a C-stage state at the same time. In this case, the second processing stability layer 5 and the processing stability layer 4 are brought into a C-stage state at the same time by single heating. Therefore, it is excellent in production efficiency.

Further, for example, when the thermosetting resin composition of the second processing stability layer 5 is thermally cured and becomes a cured product in a state where the other surface 10 of the outer frame 7 and one surface of the second processing stability layer 5 are in contact with each other, the second processing stability layer 5 can adhere to the other surface 10 of the outer frame 7. Then, when the frame member 2 and the inductor 3 (the frame member-including laminated sheet 21) in which the second processing stability layer 5 is formed is immersed in various chemical solutions (including cleaning solution for cleaning the resin smear, an electrolytic plating or an electroless plating conditioner, active solution, plating solution, etc.) and the inductor 3 is processed, it is possible to prevent the chemical solution from entering between the outer frame 7 and the second processing stability layer 5.

Therefore, since each of the one surface 9 and the other surface 10 of the outer frame 7 adheres to each of the processing stability layer 4 and the second processing stability layer 5, it is possible to prevent the chemical solution from entering the housing chamber 13.

Furthermore, each of the one surface 9 and the other surface 10 of the inner frame 8 adheres to each of the processing stability layer 4 and the second processing stability layer 5.

Modified Examples and Usage Embodiments

In the following modified examples, the same reference numerals are provided for members and steps corresponding to each of those in the above-described one embodiment, and their detailed description is omitted. Further, each of the modified examples can achieve the same function and effect as that of one embodiment unless otherwise specified. Furthermore, one embodiment and the modified examples thereof can be appropriately used in combination.

In one embodiment, the plurality of inductors 3 are set in the frame member 2. Alternatively, for example, it is also possible to set one inductor 3 in the frame member 2. Preferably, the plurality of inductors 3 are set in the frame member 2. Thus, the production efficiency is excellent.

The number of the inductor 3 is not particularly limited, as long as the number is plural. Specifically, the number of the inductor 3 is 2 or more, and 10 or less with respect to the one frame member 2.

Figure 3A:
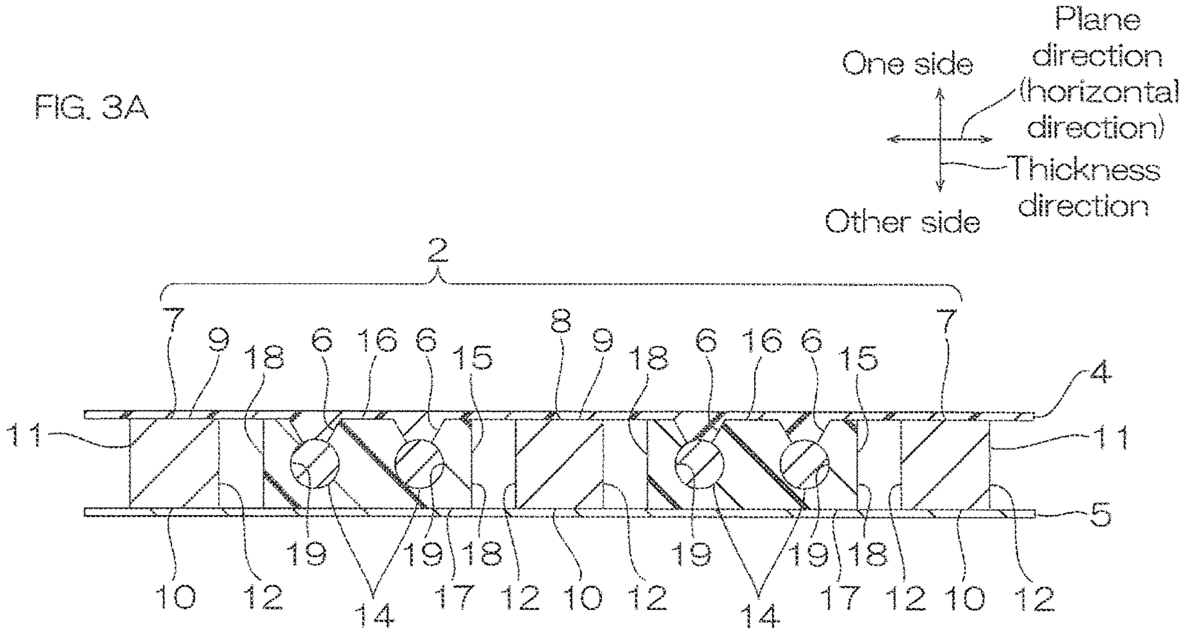
FIGS. 3A to 3B show an embodiment in which a processing stability layer is further disposed in a frame member-including laminated sheet.
Figure 3B:
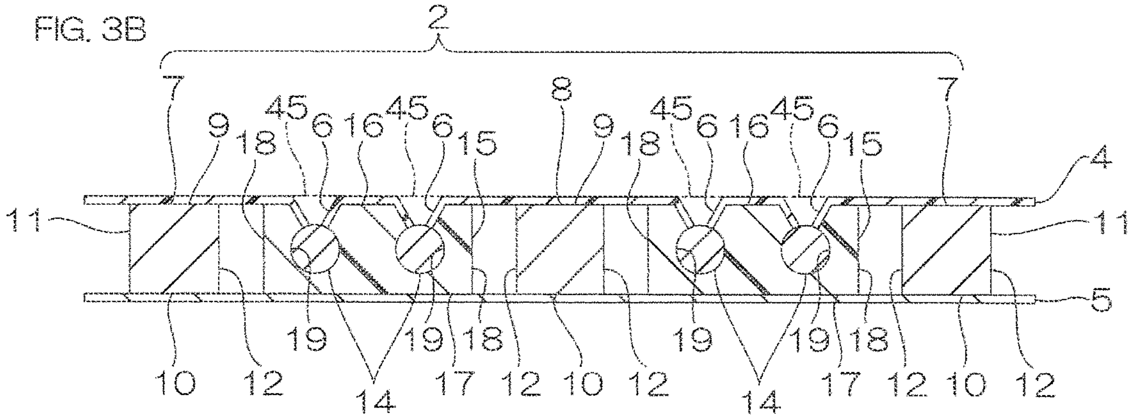

As shown in FIG. 3B, it is also possible to further form the processing stability layer 4 in the inner-side surface of the magnetic layer 15 exposed from the via 6.

For example, first, as shown in FIG. 3A, the processing stability layer 4 further fills the wiring 14 and the magnetic layer 15 exposed from the via 6.

Thereafter, as shown in FIG. 3B, the via 6 is formed again. However, the via 6 exposes the central portion of one surface in the thickness direction of the wiring 14, and does not expose the magnetic layer 15. That is, the inner-side surface of the magnetic layer 15 is covered with the newly filled processing stability layer 4.

Figure 4A:
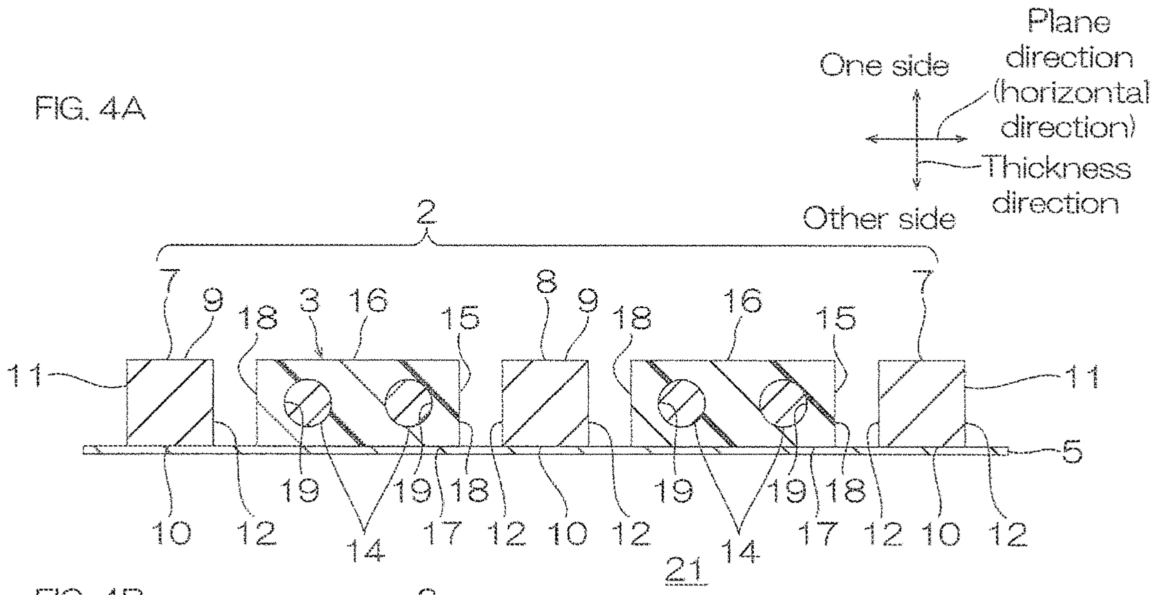
FIGS. 4A to 4D show steps for illustrating a modified example of the frame member-including laminated sheet of FIG. 1C, and a processing embodiment thereof.

As shown in FIG. 4A, the frame member-including laminated sheet 21 may not include the processing stability layer 4. The one surface 9 of the frame member 2, and the one surface 16 of the inductor 3 in the frame member-including laminated sheet 21 are exposed toward one side in the thickness direction.

Figure 4B:
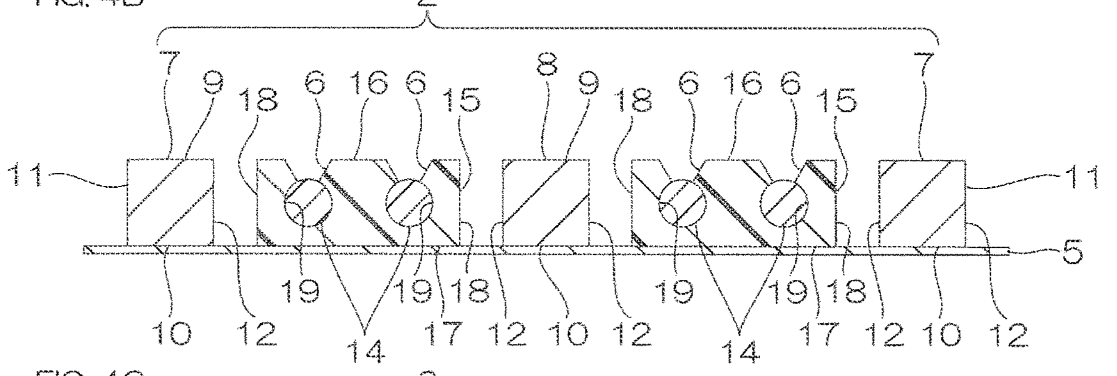
Figure 4C:
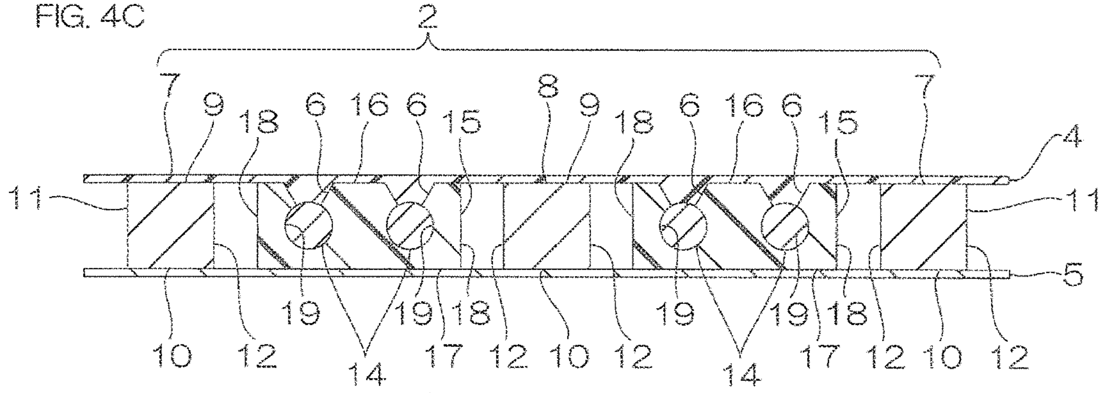
Figure 4D:
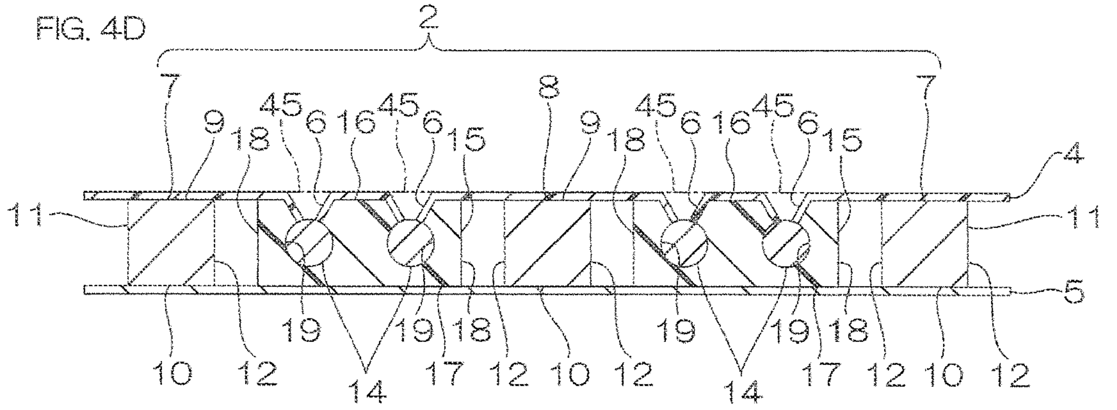

Thereafter, for example, as shown in FIG. 4B, first, the via 6 is formed in the inductor 3 of the frame member-including laminated sheet 21 shown in FIG. 4A, thereafter, as shown in FIG. 4C, the processing stability layer 4 is formed in the one surface 16 of the inductor 3 and the one surface 9 of the frame member 2 so as to fill the via 6, and subsequently, as shown in FIG. 4D, the via 6 can be also formed in the processing stability layer 4.

As shown in FIG. 4B, the via 6 is formed in the magnetic layer 15 of the frame member-including laminated sheet 21.

Subsequently, as shown in FIG. 4C, the second processing stability layer 5 fills the via 6. Thus, the second processing stability layer 5 covers the inner-side surface of the magnetic layer 15.

Thereafter, as shown in FIG. 4D, the via 6 is formed again so that the processing stability layer 4 covering the inner-side surface of the magnetic layer 15 remains. Thus, the inner-side surface of the magnetic layer 15 is covered with the processing stability layer 4.

Further, as shown in FIGS. SA to 5E, a carrier sheet 31 can be also used instead of the second processing stability layer 5. That is, as shown in FIG. 5A, the frame member 2 is disposed on a one surface 32 in the thickness direction of the carrier sheet 31. The carrier sheet 31 extends in the plane direction. The one surface 32 in the thickness direction of the carrier sheet 31 may be also subjected to peeling processing.

As shown in FIG. 5B, in the first step, the inductor 3 is brought into contact with the one surface 32 of the carrier sheet 31 exposed from the frame member 2. Thus, the frame member-including inductor 25 including the frame member 2 and the inductor 3, and supported by the carrier sheet 31 is fabricated. The frame member-including inductor 25 is an intermediate component for producing the frame member-including laminated sheet 21, does not include the processing stability layer 4 and the second processing stability layer 5 yet, and is not the frame member-including laminated sheet 21. The frame member-including inductor 25 is an industrially available device whose component alone can be distributed.

Figure 5C:
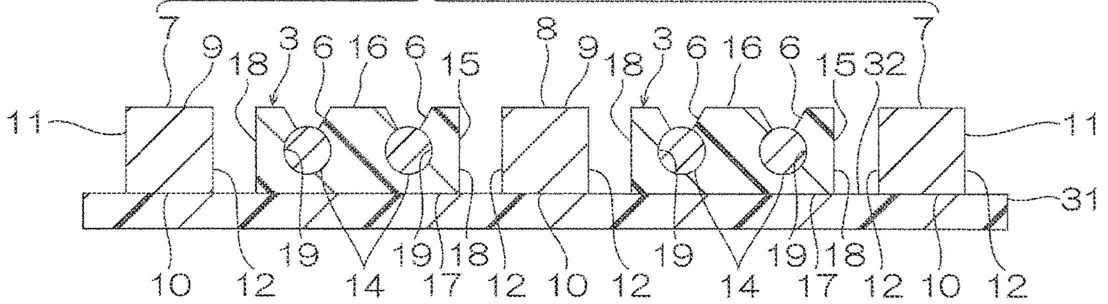

As shown in FIG. 5C, after the first step, the fourth step is carried out. In the fourth step, the via 6 is formed in the inductor 3 (the magnetic layer 15) of the frame member-including inductor 25.

Figure 5D:
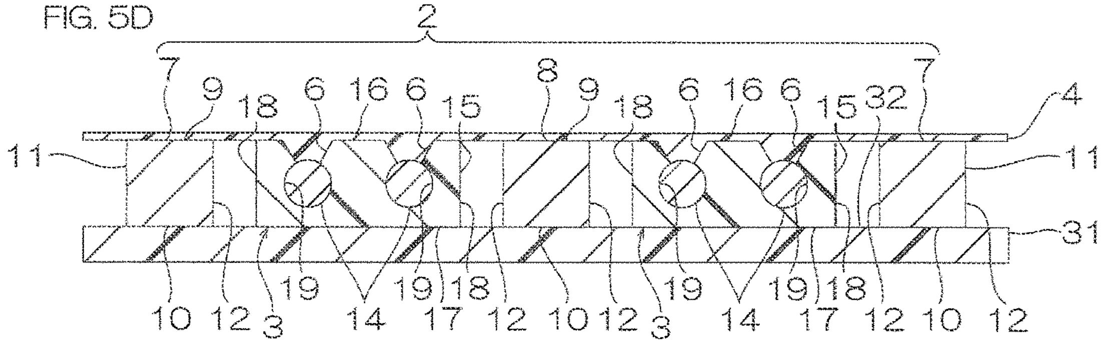
Figure 5E:
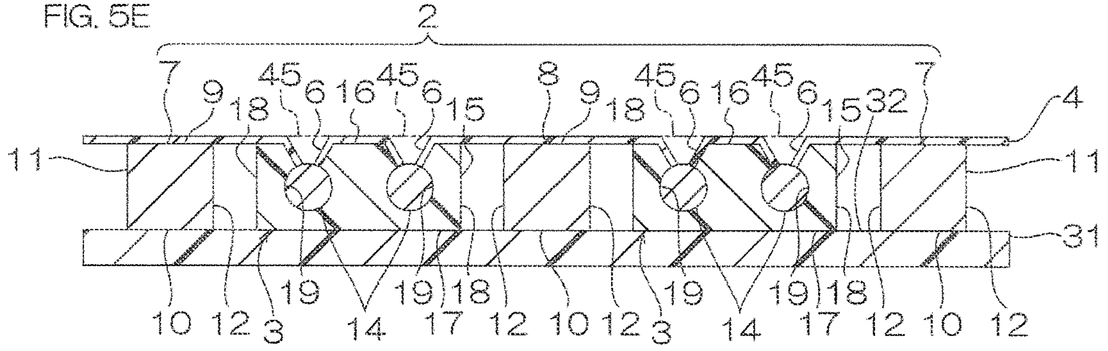

As shown in FIG. 5D, the inner-side surface of the magnetic layer 15 is covered with the processing stability layer 4, and subsequently, as shown in FIG. 5E, the via 6 is formed so that the processing stability layer 4 covering the inner-side surface of the magnetic layer 15 remains.

Thereafter, though not shown, the carrier sheet 31 is removed. Specifically, the carrier sheet 31 is peeled from the inductor 3 and the frame member 2.

Further, though not shown, a release sheet which is not shown may be also interposed between the one surface 9 of the frame member 2 and the other surface in the thickness direction of the processing stability layer 4. Thus, the frame member 2 can be also peeled from the release sheet to be reused.

As one example of the processing in the second step, the formation of the via 6 is illustrated. However, the processing in the second step is not limited to this, and examples thereof include the formation of an electrically conductive layer, cutting, covering, lamination, marking, cleaning, and etching.

In the formation of the electrically conductive layer, as shown by phantom lines of FIGS. 1D, 3B, 4D, and 5E, an electrically conductive layer 45 is formed in the via 6. Examples of a material for the electrically conductive layer 45 include conductive materials such as copper. In the formation of the electrically conductive layer 45, for example, an electrolytic copper plating solution is used. Thus, the via-including laminated sheet 1 including the electrically conductive layer 45 is obtained.

The covering includes, for example, an embodiment of covering the inductor 3 with the processing stability layer 4. The cleaning includes, for example, desmear or the like.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

DESCRIPTION OF SYMBOLS

1 Via-including laminated sheet
2 Frame member
3 Inductor
4 Processing stability layer
5 Second processing stability layer
9 One surface (frame member)
10 Other surface (frame member)
14 Wiring
15 Magnetic layer
16 One surface (inductor)
17 Other surface (inductor)
21 Frame member-including laminated sheet
25 Frame member-including inductor

The invention claimed is:

1. A frame member-including inductor, comprising:

a sheet-shaped inductor including a plurality of wirings, and a magnetic layer embedding the plurality of wirings, and a frame member in which the inductor is set;

wherein the inductor is set in a housing chamber partitioned with the frame member and having four continuous inner-side surfaces, wherein an outer-side surface of the inductor is spaced apart from the inner-side surfaces of the housing chamber, wherein the inductor has one surface and the other surface spaced apart from each other in a thickness direction of the inductor, wherein an outer shape of the magnetic layer is a same outer shape as an outer shape of the inductor, and wherein a thickness of said frame member is a same thickness as a thickness of the inductor.

2. The frame member-including inductor according to claim 1, wherein a plurality of inductors are set in the frame member.

3. A frame member-including laminated sheet, comprising:

the frame member-including inductor according to claim 2, the frame member having one surface and the other surface, and a processing stability layer formed on the one surface in a thickness direction of both said inductor and said frame member and including a cured product of a thermosetting resin composition.

4. The frame member-including laminated sheet according to claim 3, further comprising:

a second processing stability layer formed on the other surface in said thickness direction of said inductor and said frame member and including a cured product of a thermosetting resin composition.

5. A frame member-including laminated sheet, comprising:

the frame member-including inductor according to claim 1, the frame member having one surface and the other surface, and a processing stability layer formed on the one surface in a thickness direction of both said inductor and said frame member, and including a cured product of a thermosetting resin composition.

6. The frame member-including laminated sheet according to claim 5, further comprising:

a second processing stability layer formed on the other surface in said thickness direction of said inductor and said frame member and including a cured product of a thermosetting resin composition.

* * * * *